United States Patent
Araya Brenes

(10) Patent No.: US 11,013,098 B2
(45) Date of Patent: May 18, 2021

(54) PROCESS FOR THE PARTIAL OXIDATION OF FUELS AND THE DEVICE FOR APPLYING SAID PROCESS

(71) Applicant: Blueplasma Power, S.L., Castellón (ES)

(72) Inventor: Mario Araya Brenes, Castellón (ES)

(73) Assignee: Blueplasma Power, S.L., Castellon (ES)

( * ) Notice: Subject to any disclaimer, the term of this patent is extended or adjusted under 35 U.S.C. 154(b) by 512 days.

(21) Appl. No.: 15/492,175

(22) Filed: Apr. 20, 2017

(65) Prior Publication Data

US 2017/0318655 A1    Nov. 2, 2017

(30) Foreign Application Priority Data

Apr. 27, 2016    (ES) .................. P 201630537

(51) Int. Cl.
*H05H 1/34*    (2006.01)
*C01B 3/34*    (2006.01)
(Continued)

(52) U.S. Cl.
CPC .............. *H05H 1/34* (2013.01); *B01J 19/088* (2013.01); *B01J 19/123* (2013.01); *C01B 3/32* (2013.01); *C01B 3/342* (2013.01); *C01B 3/36* (2013.01); *C01B 3/386* (2013.01); *B01J 2219/0871* (2013.01); *B01J 2219/0875* (2013.01); *B01J 2219/0883* (2013.01); *B01J 2219/0892* (2013.01); *B01J 2219/0894* (2013.01); *B01J 2219/0898* (2013.01);
(Continued)

(58) Field of Classification Search
None
See application file for complete search history.

(56) References Cited

U.S. PATENT DOCUMENTS 6,322,757 B1 * 11/2001 Cohn ..................... B01J 19/088
                                                    123/3
2003/0141182 A1    7/2003 Kong et al.
(Continued)

FOREIGN PATENT DOCUMENTS

CA        1059065      7/1979
GB        2501865      11/2013
(Continued)

OTHER PUBLICATIONS

Kim, S. C. et al "Production of hydrogen by partial oxidation with thermal plasma" Renewable Energy, 2008, vol. 33, No. 7, p. 1564-1569.
(Continued)

*Primary Examiner* — Kishor Mayekar
(74) *Attorney, Agent, or Firm* — Vedder Price, P.C.

(57) ABSTRACT

The invention comprises a process for obtaining a gas from a fluid fuel and an oxidising fluid, said process comprising steps in which the incoming fluid is subjected to temperature, photocatalytic action and reaction with catalysts, all this within a device with a tubular structure which the incoming fluid circulates through in a spiral manner, between a fixed bed attached to the walls of the duct and a circulating bed with an ionised gas stream that occupies a central position of the duct, producing a gas obtained.

20 Claims, 1 Drawing Sheet

(51) Int. Cl.
*C01B 3/32* (2006.01)
*B01J 19/08* (2006.01)
*C01B 3/36* (2006.01)
*B01J 19/12* (2006.01)
*C01B 3/38* (2006.01)

(52) U.S. Cl.
CPC .............. *C01B 2203/0261* (2013.01); *C01B 2203/0861* (2013.01); *C01B 2203/1047* (2013.01); *C01B 2203/1058* (2013.01); *C01B 2203/1076* (2013.01); *C01B 2203/1211* (2013.01); *C10J 2300/1238* (2013.01); *H05H 2001/3468* (2013.01); *Y02P 20/52* (2015.11)

(56) References Cited

U.S. PATENT DOCUMENTS

2003/0221949 A1* 12/2003 Rabinovich .............. H05H 1/48
 204/164
2010/0003556 A1 1/2010 Hartvigsen et al.
2014/0209573 A1 7/2014 Foret
2015/0246337 A1* 9/2015 Hong .................... B01J 19/088
 422/186.29

FOREIGN PATENT DOCUMENTS

| WO | WO01/00310 A2 | 1/2001 |
| WO | WO01/14702 A1 | 3/2001 |
| WO | WO2011/119274 A1 | 9/2011 |

OTHER PUBLICATIONS

Chao, Yu, et al "Hydrogen production via partial oxidation of methane with plasma-assisted catalysis" International Journal of Hydrogen Energy, 2008, vol. 33, No. 2, p. 664-671.

European Search report dated Jul. 17, 2017 issued in connection with EP17166070; 9 pgs.

Spanish search report dated Jan. 30, 2017 issued in connection with 201630537; 6 pgs.

* cited by examiner

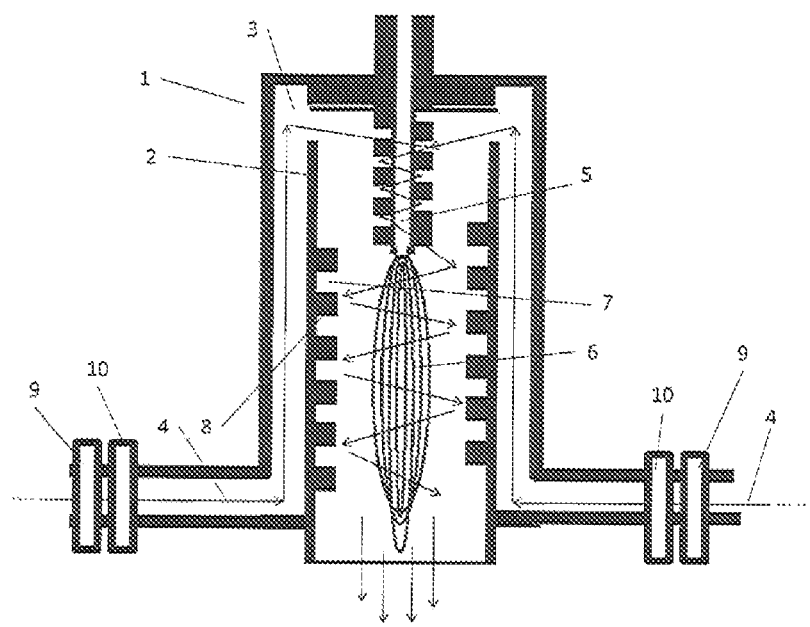

PROCESS FOR THE PARTIAL OXIDATION OF FUELS AND THE DEVICE FOR APPLYING SAID PROCESS

CROSS-REFERENCE TO RELATED APPLICATIONS

This application claims the benefit of and priority from Spain Application No. P 201630537, filed Apr. 27, 2016, which is wholly incorporated herein by reference.

As the title indicates, the invention comprises: A) a process for obtaining a gas from a fluid fuel and an oxidising fluid, B) a device for applying the process disclosed, and C) the gas finally obtained.

The process comprises the oxidation-reduction reaction of a fluid, which we shall call the incoming fluid.

This incoming fluid comprises two groups of reagent fluids:
 a) One is the fuel and comprises at least one fluid fuel in liquid or gas form.
 b) The other is the oxidising agent and comprises at least one oxidising fluid in liquid or gas form.

The reaction takes place in a device comprising at least one heat exchanger, at least one generator to produce ionised gas, preferably a thermal plasma generator, at least one protonator (proton donor) for the oxidising fluid, at least one optional deprotonator for the fluid fuel and at least one photo-reactor, preferably tubular, on the inside walls of which is a fixed bed containing at least one type of catalyst, and throughout its central part a circulating fluid-bed with an ionised gas stream preferably projecting ultraviolet light.

There are different types of thermal plasma that produce a stream of ionised gas known as a plasma torch, applicable to this invention; thus, for example, there are those that work by microwaves, induction/radiofrequency, electric arc and dielectric-barrier discharge, of which we prefer the non-transferred electric arc based on direct current or the induction based on alternating current, or a combination of both; the last two have the capacity of projecting ultraviolet light via a torch with a stream of ionised gas at high temperature, based on at least one of the following elements or compounds of the group: oxygen, hydrogen, carbon dioxide, carbon monoxide, steam, nitrogen, air, helium or argon and protonated steam.

Herein we shall define incoming fluid as the fluid introduced in the device and comprising two groups of compounds:
 a) The first group shall be called the fluid fuel, comprising at least one fluid fuel comprising molecules of at least one non-oxidised carbon atom.
 b) The second group shall be called the oxidising fluid, comprising at least one reactive fluid that will provide oxygen such as air, oxygen-enriched air, oxygen, carbon dioxide or steam.

The gas obtained is the gas resulting from the reaction that causes the partial oxidation of the carbon atoms of the fluid fuel, said gas obtained being by volume mostly carbon monoxide and hydrogen or carbon dioxide and hydrogen, depending on the amount of oxidising fluid used in each case.

The relevant sector of the art is that of energy production processes and devices.

BACKGROUND

Conventional systems of partial oxidation by ionised gas streams, known as thermal plasma torches, use a reactor with at least one plasma torch inside, in order to generate intense heat through which passes at least one reagent that provides oxygen and at least one fuel in gas, liquid or solid form, such as hydrocarbons, biomass, solid organic waste and pyrolysis gas, to produce carbon monoxide and hydrogen when the objective is to generate synthesis gas, or carbon dioxide and hydrogen when the objective is to generate hydrogen.

Said conventional systems for partial oxidation with plasma torches to generate heat generally comprise at least one reactor, a thermal plasma torch within the reactor and a way to feed in the reagents. These reactors usually comprise a metal or ceramic container through which the ionised gas of the plasma torch and the incoming fluid usually circulate.

In these conventional systems, not all the molecules of the fuel and oxidising agents come in contact with the plasma torch and not all the holding times are the same for all molecules, since a currents are formed inside the reactor with different speeds and distances with respect to the plasma torch, giving rise to a certain amount of unreacted fuel (URF) which shall hereinafter be referred to by its acronym.

In order to prevent the aforementioned problems, we have tried to place the wall of the reactors close to the plasma torch so that when the incoming fluid circulates around the ionised gas of said torch there is a propagation of free radicals causing the partial oxidation of the incoming fluid; however, the walls of the reactor suffer accelerated deterioration due to the high temperature at which the plasma torch operates, which is why the walls of the reactors are sometimes cooled, which reduces the efficiency thereof. On the other hand, if in this system we make the incoming fluid circulate at a greater speed in order to cool down the walls and thus prevent them from damage, then the portion of URF increases the efficiency of the process also decreases.

In the current state of the art there are patents where the fuel and the oxidising agents are introduced around the plasma torch in order to achieve greater efficiency, reducing the percentage of URF and also keeping the walls of the reactor at a temperature much lower than that of the plasma torch. Some of these use the term steam reforming instead of partial oxidation, and they use the term synthesis gas for the partially oxidised gas containing mostly hydrogen with carbon monoxide or with carbon dioxide.

The company Foret Plasma Labs LLC has carried out efforts in this direction through U.S. Pat. No. 9,163,584 of 20 Oct. 2015, which discloses a cylindrical reactor of ceramic material with a plasma torch connected to a turbine that reforms fuel in a compressed air burner, flowing as a vortex. Foret Plasma Labs LLC, by means of patent U.S. Pat. No. 7,622,693 of 24 Nov. 2009, also discloses a vertical truncated cone reactor with an induction plasma torch, where the raw material enters as a vortex from the top, which has the greatest diameter, towards the bottom, which has the smallest diameter. The same company, in patent US 2014/0209573 of 31 Jul. 2014, discloses the same as the previous one, only that it is aimed at producing synthesis gas for supplying power plants using a combination of induction plasma applied from outside the reactor and electrical arc plasma with the electrode inserted in the central part, within the cylindrical or truncated cone reactor, so that the incoming gas rotates as a vortex around the latter.

Igor Matveev was granted U.S. Pat. No. 7,973,262 B2 in July 2011 regarding steam reforming by plasma torch, using a device that comprised a triple vortex, with the reagents (fuel and oxidising agent) circulating in an opposite direction to that of the ionised gas of the plasma torch.

The company Hynergreen Technologies S.A., in patent PCT/2007/141350 filed in December 2007, discloses the process under which fuel can be reformed with steam at low temperature and at atmospheric pressure, via induction plasma with dielectric-barrier discharge, wherein the cathode is a steel cylinder with barely perceptible roughness, achieving a conversion of approximately 0.006 m3/hour applying a power of 15 to 30 kWh with a frequency from 3 to 15 kHz at temperatures below 500° C. and at atmospheric pressure, achieving approximately 0.0002 m3/kWh consumed by the plasma, with 15.7 minutes of holding time.

The company Alter NRG Corp. was granted U.S. Pat. No. 9,005,320 in August 2015, which discloses a vertical cylindrical device with the inlet for the plasma torch at mid-height. The company Platinum, in U.S. Pat. No. 6,680,137, discloses a reactor similar to that of Alter NRG, incorporating heat recovery, declaring as its achievement the conversion of approximately 4.54 kg of methane per square metre of internal surface of the reactor.

The company Plasco in patent CA 2424805 discloses a two-step photo-reactor for fuel reforming with steam or oxygen, wherein in the first step ash or coal is extracted in order to apply in the second step a plasma torch such as to produce with an oxidising agent a partial oxidation and thus obtain more synthesis gas in the system.

Siemens, in patent US 20150252274, discloses a plasma reactor wherein it uses low temperature steam to cool the walls of the photo-reactor and thus bring the fuel gas closer to the plasma torch. Drexel University, in U.S. Pat. No. 7,867,457 of 2011, highlighted as a novelty the different forms of turbulence that may be caused in cylindrical reactors with plasma torches in order to accelerate the partial oxidation process of the fuel gas.

It would be ideal that, at a pressure close to the atmospheric pressure, at temperatures of less than 750° C., with a holding time of less than 10 seconds and consuming less than 1 kWh per kg of carbon contained in the fluid fuel, the incoming fluid achieved, in a single pass, a partial oxidation of the fluid fuel, with a conversion to gas obtained of more than 80%.

The current state of the art has not found an economical and practical solution to achieve these conditions in fuel reforming, and this is precisely what was achieved with this invention.

DESCRIPTION OF THE INVENTION

With the process object of this invention an incoming fluid, comprising fluid fuel and an oxidising fluid, is subjected to a series of conditions and contacts within a device that comprises a photo-reactor such that an oxidation-reduction reaction is forced to take place, through which the partial oxidation of carbon atoms of the fluid fuel is produced, giving rise to a gas obtained that comprises mostly carbon monoxide and hydrogen or carbon dioxide and hydrogen, depending on the amount of oxidising fluid used in each case.

To do this, during the process the incoming fluid circulates in a vortex along the inside of the photo-reactor, between the two beds: the fixed bed joined to the inner wall of the main body of the photo-reactor, which may have barriers or projections, and the circulating bed that circulates through the centre of the photo-reactor and that comprises a stream of ionised gas, preferably from a thermal plasma system. The incoming fluid thus forms a cloud with expansive turbulence and homogeneous molecular distribution, which when exposed to intense heat from the ionised gas and to the effect of the ultraviolet light from the plasma torch, produces a heterogeneous photo-catalysis that is activated by the action of at least one catalyst in the fixed bed and causes an oxidation-reduction reaction between the fluid fuel and the oxidising fluid which produces partial oxidation in the fluid fuel at temperatures of less than 750° C. with holding times of less than 10 seconds, at a pressure close to the atmospheric pressure and with a consumption of less than 1 kWh each kg of carbon contained in the fluid fuel, thus producing a result of 80% conversion of the incoming fluid to gas obtained.

The catalyst from the fixed bed comprises at least one pure substance in a mixture or alloy from the following group: iron II and III, copper, nickel, alumina, titanium dioxide, silicon dioxide, quartz, molybdenum, cobalt, vanadium and tungsten.

Of the effects to which the fluid fuel and the oxidising fluid are subjected in the photo-reactor to achieve gas obtained via the oxidation-reduction reaction there are essentially three, which may concur producing synergies and magnifying one another:

1) the effect caused by the incoming fluid due to its circulation in a vortex, with expansive turbulence and homogeneous molecular distribution, which multiplies when it collides with projections that may optionally exist on the fixed bed that is fixed to the inner wall of the main body of the photo-reactor; said vortex induces rotation to part of the ionised gas from the plasma torch and forms a cloud that puts pressure around, along and towards the centre of said ionised gas, creating multiple contacts with the molecules until it forms a single mixed fluid that is highly ionised and with a homogeneous molecular distribution.

2) the effect of propagating free radicals caused by the incoming fluid coming in contact with a circulating fluid bed that comprises the ionised gas, preferably with the oxidising fluid being previously protonated in order to increase its propensity to be reduced, and the fluid fuel being previously deprotonated in order to increase its propensity to be oxidised.

3) the effect of the previous point, increased by the radiation from the ultraviolet light generated by the ionised gas stream from the plasma torch due to its photocatalytic action activated by at least one catalyst from the fixed bed which comprises, as stated above, at least one pure substance in a mixture or alloy from the following group: iron II and III, copper, nickel, alumina, titanium dioxide, silicon dioxide, quartz, molybdenum, cobalt, vanadium and tungsten.

With the previous effects, especially if they concur, special and surprising technical and economic conditions are obtained to optimise profitability in partial oxidation processes for fuels, commonly known as reforming processes, thus improving upon the current state of the art.

In order to obtain a conversion of more than 80% of the incoming fluid to gas obtained in the photo-reactor, with a holding time of less than 10 seconds, at a pressure close to atmospheric pressure, at temperatures of less than 750° C. and consuming less than 1 kWh per kg of carbon contained in the fuel, the process that is the subject matter of this invention comprises the following steps:

1. In a first step the incoming fluid, comprising fluid fuel and oxidising fluid, is introduced in the main body of the photo-reactor, tangentially to the ionised gas stream in order to initiate a vortex. Optionally the incoming fluid may be previously heated at its entry into the main body of the photo-reactor.

2. In a second step the vortex formed by the incoming fluid starts to circulate along the photo-reactor in the space between the fixed bed and the circulating bed.
3. In a third step, since the incoming fluid circulates in the form of a vortex, its outside part collides with the fixed bed joined to the inner wall of the photo-reactor and the optional projections on said fixed bed, whereas the inside part collides with the molecules of the circulating bed comprising the hot ionised gas stream, thus taking on the characteristics of a hot fluid that circulates in a spiral and with expansive turbulence.
4. In a fourth step, the spiralling fluid with expansive turbulence induces the rotation of the ionised gas stream and forms a single mixed gas that is highly ionised and with a homogeneous molecular distribution, which shall hereinafter be called the mixed gas.
5. In a fifth step the mixed gas absorbs the intense heat of the ionised gas stream to produce a chemical oxidation-reduction reaction that produces the gas obtained.

The process can be optimised if the ionised gas stream comes from a plasma torch system that projects ultraviolet light are, since this produces very high temperature photocatalytic effects, which increase when they interact with at least one catalyst in the fixed bed.

The gas obtained is a synthesis gas that by volume comprises mostly carbon monoxide, hydrogen and carbon dioxide, and minority traces of hydrocarbons and other by-products of the process.

The percentage amounts of carbon monoxide or carbon dioxide in the gas obtained shall vary, and can be majority or minority amounts depending on the amount of oxidising fluid present in the incoming fluid. A greater proportion of oxidising fluid present in the incoming fluid produces a greater proportion of carbon dioxide in the gas obtained.

The limit is set when all the carbon monoxide is converted into carbon dioxide and, if at this point the percentage of oxidising fluid is increased in the incoming fluid, what is produced is a combustion in which the hydrogen also starts to oxidise and convert into steam.

The device for carrying out the process disclosed comprises:

A photo-reactor, comprising:
A main body with one or more inlet openings and one or more outlet openings, said main body having a tubular shape.
A system that produces and injects a high temperature ionised gas stream.
A circulating bed with an ionised gas, preferably thermal plasma.
A fixed bed joined to the inner wall of the main body of the photo-reactor and that may optionally comprise partial barriers, that we call projections, fixed to said inner wall or forming part of it.
A catalyst in the fixed bed.
The device may also comprise:
A heat exchanger, independent or preferably incorporated into the photo-reactor itself, wherein the gas obtained provides heat to the incoming fluid.
A protonator for the oxidising fluid and an optional deprotonator for the fluid fuel, both preferably placed before the heat exchanger.

The photo-reactor, with a tubular structure, preferably has the shape of a drum, cylinder or truncated cone, and in this case having the ionised gas stream injector, preferably thermal plasma, on the base of greater diameter.

With respect to the size of the photo-reactor, its main body has along its path a section of the duct the average inner diameter of which is at least 0.1 cm and at most 5 cm for each kilogram of carbon contained in the fluid fuel that will circulate therein, having a preferred range of 0.4 cm to 1.5 cm; the minimum length is 0.4 cm for each kilogram of carbon contained in the fluid fuel and the maximum length is 17 cm, having a preferred range of 2 cm to 8 cm.

The fixed bed is joined to the inner wall of the main body of the photo-reactor and the projections are fixed to it when applicable.

The projections may be of any geometry, and the distribution must be such that they cover the entire inner perimeter of the main body of the photo-reactor, without there being an open channel in a straight line along the inner wall of the duct of the photo-reactor communicating its outlet with the area in which the incoming fluid circulates, and the height must be between 3% and 40% of the average diameter of the duct of the photo-reactor, with the preferred range being between 15% and 25%.

The heat exchanger may be independent of the photo-reactor, or preferably incorporated thereto as a cover or jacket enclosing the main body of the reactor, leaving a space in between them and thus turning it into a double jacket heat exchanger, in which case it has, among others, the following possible pathways for heat transmission.

1) By circulation of the mixed gas and the gas obtained inside the main body of the photo-reactor, transferring heat to the inner wall of the photo-reactor, which in turn transfers it to the incoming fluid that circulates between the double jacket and adjacently to said wall, such as occurs in double jacket heat exchangers, and the circulation of these fluids is preferably as a countercurrent.
2) By introducing the incoming fluid into the duct through which the ionised gas stream circulates, moving as a vortex around said stream, thus causing a direct heat exchange.
3) And, since the photo-reactor becomes an extension to the heat exchanger, by penetration of the incoming fluid into the hollow central area and along the photo-reactor, where the ionised gas circulates.

The catalyst of the fixed bed comprises at least one pure compound or alloy, where its main element is at least one from the following group: iron II and III, copper, nickel, alumina, titanium dioxide, silicon dioxide, quartz, molybdenum, cobalt, vanadium and tungsten.

The photo-reactor is preferably manufactured in a material comprising at least one compound from the group where its main element is ceramic or metal or a combination of both; those preferred are tungsten, steel/iron and quartz.

Regarding the ionised gas generator, we prefer the non-transferred electric arc thermal plasma based on direct current or the induction thermal plasma based on alternating current, or a combination of both, all with the capacity of projecting ultraviolet light with a plasma torch comprising a high-temperature ionised gas produced based on at least one of the following elements or compounds of the group: oxygen, hydrogen, carbon dioxide, carbon monoxide, steam, nitrogen, air, helium or argon and preferably protonated steam.

BRIEF EXPLANATION OF THE DRAWING

FIG. 1 shows a conceptual diagram for a device wherein the process that is the subject matter of this invention is carried out, depicting the photo-reactor (1) comprising a main body (2), a space (3) between the double jacket through which the incoming fluid (4), after its oxidising fluid passes through a protonator (10) and its fuel fluid passes through a deprotonator (9), circulates until it reaches the inside of the reactor and enters tangentially to the ionised gas stream (5) of the thermal plasma to then, in a vortex, circulates between the circulating bed (6) and the fixed bed (7), colliding with the projections (8) of the fixed bed (7).

DESCRIPTION OF AN EMBODIMENT OF THE INVENTION

We shall now describe one embodiment of the invention that is only one of many ways of implementing it, using the device of FIG. 1. The temperatures are shown in degrees centigrade.

The intended patent comprises a process for the partial oxidation of a fluid fuel, for which purpose an incoming fluid, comprising a previously deprotonated fluid fuel and a previously protonated oxidising fluid are introduced into a device comprising:
- A photo-reactor (1) which in turn comprises:
  - A main body (2) with one or more inlet openings and one or more outlet openings, said main body having a tubular structure, preferably cylindrical or frustoconical, and being covered by a double jacket such that a space (3) is created through which the incoming fluid (4) is introduced, which when circulating absorbs heat from the main body.
  - A system for producing and injecting ionised gas comprising an ionised gas stream (5) preferably obtained from a thermal plasma the injector of which is preferably on the end of the main body with the largest cross-section.
  - A circulating bed (6) with an ionised gas.
  - A fixed bed (7) joined to the inner wall of the main body of the photo-reactor that may optionally comprise partial barriers, that we call projections (8), fixed to said inner wall or forming part of it.
  - A catalyst in the fixed bed comprising at least one pure compound or alloy, where its main element is at least one from the following group: iron II and III, copper, nickel, alumina, titanium dioxide, silicon dioxide, quartz, molybdenum, cobalt, vanadium or tungsten.
  - A protonator (10) for the oxidising fluid and optionally a deprotonator (9) for the fluid fuel, both placed before the heat exchanger.

The main body is enclosed in a double jacket that creates a space (3) that works as a heat exchanger when the incoming fluid (4) circulates in contact with the wall of the main body where, on its inner face, the fixed bed (7) with its projections (8) is joined.

Inside the main body (2) is the circulating bed (6) such that the incoming fluid (4) circulates in a vortex between the fixed bed (7) and the circulating bed (6).

The process starts with the passage of the incoming fluid, of which the part corresponding to the fluid fuel has previously passed through a protonator (10) and the part corresponding to the oxidising fluid has passed by a deprotonator (9).

After the protonation and deprotonation operation, the incoming fluid circulates through the space (3) between the double jacket of the photo-reactor where it is heated by circulating in contact with the wall of the main body (2).

The incoming fluid (4) starts circulating from the bottom upwards through the space (3) of the double jacket until it enters through the top part of the main body and the inside of the photo-reactor, entering tangentially to the ionised gas stream (5) of the thermal plasma, and starts to circulate in a vortex and expansive turbulence within the photo-reactor, from the top downwards; that is, circulating around and in close contact on the inside with the circulating bed (6) with the ionised gas stream of the plasma torch and on the outside with the fixed bed (7) and the projections (8).

As it circulates like this, the ionised gas from the plasma torch mixes with the fluid fuel and the oxidising fluid until it becomes a single mixed gas forming a highly ionised mist or cloud with homogeneous molecular distribution, wherein the following effects concur:
1) the effect produced by the incoming fluid due to entering circulating as a vortex, with expansive turbulence and a homogeneous molecular distribution, which multiplies when it collides with the projections (8); said vortex induces rotation in the ionised gas and turns it into a circulating bed (6) and forms a cloud that puts pressure around, along and towards the centre of said ionised gas, creating multiple contacts with the molecules until it forms a single mixed fluid or gas that is highly ionised and with a homogeneous molecular distribution.
2) the effect of propagating free radicals in the incoming fluid, produced by coming in contact with a circulating fluid bed that comprises the ionised gas, preferably with the oxidising fluid being previously protonated in order to increase its propensity to be reduced, and the fluid fuel being previously deprotonated in order to increase its propensity to be oxidised.
3) when the ionised gas stream is generated by a plasma torch, the effect produced in the mixed gas due to the radiation of ultraviolet light that is increased by its photocatalytic action when it interacts with at least one catalyst of the fixed bed which, as we have said, comprises at least one pure substance, in a mixture or alloy, from the following group: iron II and III, copper, nickel, alumina, titanium dioxide, silicon dioxide, quartz, molybdenum, cobalt, vanadium and tungsten.

The three effects described partially oxidise the fluid fuel, resulting in the gas obtained. This process and device allow the aforementioned effects to take place, thus obtaining a partial oxidation process that occurs at temperatures of less than 750° C., at a pressure of 200 millibar, with a holding time of 0.2 seconds and consuming 0.5 kWh per kg of natural gas.

The invention claimed is:
1. A FUEL REFORMING DEVICE FOR A PARTIAL OXIDATION OF FUELS comprising:
  a photo-reactor including a main body with an inlet opening and an outlet opening, wherein the main body has a tubular configuration;
  a fixed bed disposed about an inner wall of the tubular main body;
  at least one catalyst disposed in the fixed bed;
  an ionized gas generator disposed at one end of the tubular main body of the photo-reactor, wherein the ionized gas generator is configured to produce a stream of ionized gas and is disposed in a center of the main body of the photo-reactor at a temperature preferably not higher than 750° C.;
  wherein the inlet opening is disposed adjacent the stream of ionized gas to introduce an incoming fluid, comprising a mixture of a fluid fuel and an oxidizing fluid, into the tubular main body of the photo-reactor tangentially to the stream of ionized gas produced by the generator to initiate a vortex flow that induces rotation in the stream of ionized gas to generate a circulating bed in the form of a cloud that exerts pressure around, along and towards a center of the stream of ionized gas, creating multiple contacts among the stream of ionized gas and the incoming fluid until a single mixed gas comprising the incoming fluid and the stream of ionized gas is generated that is highly ionized and has a homogeneous molecular distribution; and a protonator connected to the inlet opening of the photo-reactor, wherein the protonator is configured to protonate the oxidizing fluid in order to increase its propensity to be reduced.

2. The DEVICE FOR THE PARTIAL OXIDATION OF FUELS according to claim 1 further comprising a heat exchanger, defined in a space defined between a double jacket of the main body of the photo-reactor, wherein the heat exchanger is disposed such that a gas to be obtained provides heat to the incoming fluid.

3. The DEVICE FOR THE PARTIAL OXIDATION OF FUELS according to claim 2 wherein the protonator is disposed before the heat exchanger.

4. The DEVICE FOR THE PARTIAL OXIDATION OF FUELS according to claim 2 further comprising a deprotonator disposed before the heat exchanger.

5. The DEVICE FOR THE PARTIAL OXIDATION OF FUELS according to claim 1 wherein the fixed bed includes a series of projections joined to the inner wall.

6. The DEVICE FOR THE PARTIAL OXIDATION OF FUELS according to claim 5 wherein the projections are disposed so as to cover an entire inner perimeter of the main body so that there is not an open channel in a straight line adjacent to and along the inner wall.

7. The DEVICE FOR THE PARTIAL OXIDATION OF FUELS according to claim 5 wherein a height of the projections is between approximately 3% and approximately 40% of an average inner diameter of the main body.

8. The DEVICE FOR THE PARTIAL OXIDATION OF FUELS according to claim 1 wherein the ionized gas stream is produced from a gas that includes a protonated steam.

9. The DEVICE FOR THE PARTIAL OXIDATION OF FUELS according to claim 1 wherein the tubular configuration of the main body is cylindrical or frustoconical.

10. The DEVICE FOR THE PARTIAL OXIDATION OF FUELS according to claim 1 wherein the tubular configuration of the main body has along an extent thereof a cross-section with an average inner diameter of, for each kilogram of carbon contained in the fluid fuel, approximately 0.1 cm to approximately 5 cm.

11. The DEVICE FOR THE PARTIAL OXIDATION OF FUELS according to claim 1 wherein the main body, has for each kilogram of carbon contained in the fluid fuel, a length of approximately 0.4 cm to approximately 17 cm.

12. The DEVICE FOR THE PARTIAL OXIDATION OF FUELS according to claim 1 wherein the ionized gas stream comprises at least one of the elements or compounds selected from of the group consisting of: air, oxygen, nitrogen, hydrogen, helium, argon, carbon dioxide, carbon monoxide and water or steam, protonated or deprotonated.

13. The DEVICE FOR THE PARTIAL OXIDATION OF FUELS according to claim 1, wherein the fluid fuel includes molecules of at least one non-oxidized carbon atom.

14. The DEVICE FOR THE PARTIAL OXIDATION OF FUELS according to claim 1, wherein the oxidizing fluid includes at least one reactive fluid that supplies oxygen selected from the group consisting of: air, air enriched with oxygen, oxygen, carbon dioxide or steam.

15. The DEVICE FOR THE PARTIAL OXIDATION OF FUELS according to claim 1, wherein the at least one catalyst of the fixed bed includes at least one selected from the group consisting of: iron II and III, copper, nickel, alumina, titanium dioxide, silicon dioxide, quartz, molybdenum, cobalt, vanadium and tungsten.

16. A method of using the DEVICE FOR THE PARTIAL OXIDATION OF FUELS according to claim 1, comprising the following steps:
(a) introducing the incoming fluid including the fluid fuel and the oxidizing fluid into the main body of the photo-reactor tangentially to the stream of ionized gas to initiate the vortex flow, and pronating the oxidizing fluid prior to introducing into the main body of the photo-reactor;
(b) generating the mixed gas including the incoming fluid and the stream of ionized gas that is highly ionized and with homogeneous molecular distribution;
(c) carrying out an oxidation-reduction reaction of the incoming fluid by absorbing intense heat of the stream of ionized gas existing in the mixed gas and being activated by the action of the at least one catalyst in the fixed bed and thus producing a gas to be obtained, wherein the carrying out an oxidation-reduction reaction of the incoming fluid step occurs at a temperature of less than 750° C.; and
(d) evacuating the gas to be obtained in step (c) through the outlet opening of the main body of the photo-reactor.

17. The method of using the DEVICE FOR THE PARTIAL OXIDATION OF FUELS according to claim 16 further comprising:
holding the incoming fluid inside the main body of the photo-reactor for a time that is less than 10 seconds.

18. The method of using the DEVICE FOR THE PARTIAL OXIDATION OF FUELS according to claim 16 wherein the carrying out an oxidation-reduction reaction of the incoming fluid step has a power consumption of less than 1 kWh for each kg of carbon contained in the fluid fuel of the incoming fluid.

19. The method of using the DEVICE FOR THE PARTIAL OXIDATION OF FUELS according to claim 16 further comprising heating the incoming fluid prior to introducing into the main body of the photo-reactor.

20. The method of using the DEVICE FOR THE PARTIAL OXIDATION OF FUELS according to claim 16 further comprising deprotonating fluid fuel of the incoming fluid prior to introducing it into the main body of the photo-reactor.

* * * * *